UNITED STATES PATENT OFFICE.

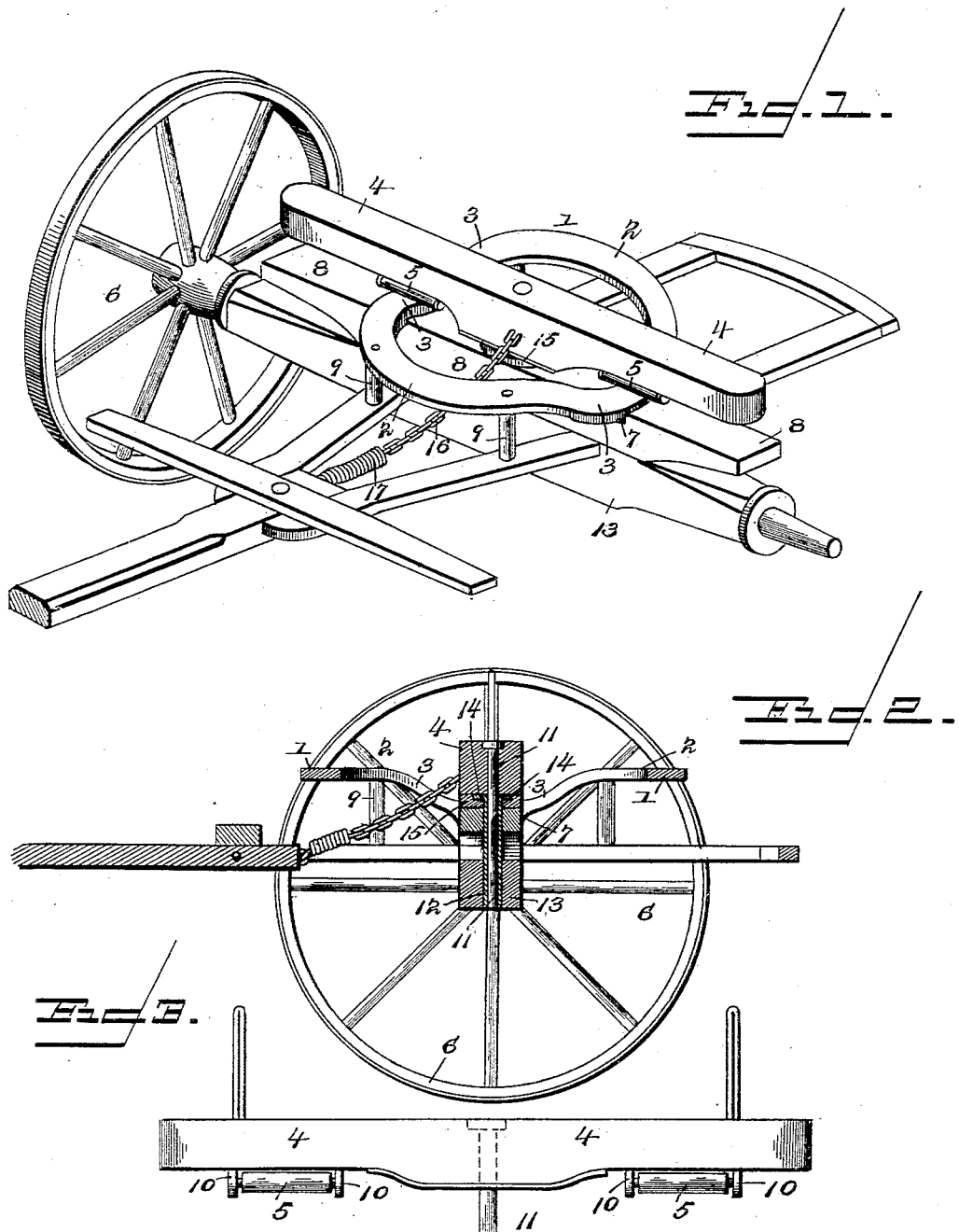

EDWARD V. WAGNER AND SAMUEL H. PENQUITE, OF URBANA, OHIO.

FIFTH-WHEEL.

SPECIFICATION forming part of Letters Patent No. 504,640, dated September 5, 1893.

Application filed March 30, 1893. Serial No. 468,331. (No model.)

*To all whom it may concern:*

Be it known that we, EDWARD V. WAGNER and SAMUEL H. PENQUITE, citizens of the United States, residing at Urbana, in the county of Champaign and State of Ohio, have invented a new and useful Fifth-Wheel, of which the following is a specification.

The invention relates to improvements in fifth wheels.

The object of the present invention is to provide a simple and inexpensive fifth wheel adapted to be readily applied to a vehicle, and capable of elevating the body of a vehicle in turning to prevent the front wheels coming in contact with and injuring the body or otherwise damaging a vehicle, and to facilitate turning and moving heavily loaded vehicles.

The invention consists in the construction and novel combination and arrangement of parts hereinafter fully described, illustrated in the accompanying drawings and pointed out in the claims hereto appended.

In the drawings—Figure 1 is a perspective view of a portion of a vehicle provided with a fifth wheel constructed in accordance with this invention. Fig. 2 is a vertical longitudinal sectional view. Fig. 3 is a detail view of the bolster showing the rollers.

Like numerals of reference indicate corresponding parts in all the figures of the drawings.

1 designates a circular fifth wheel constructed of suitable metal and having raised ends 2 and oppositely inclined sides 3 extending upward from the sand board or bolster, to which the fifth wheel is secured, both forward and rearward to the end or front and back portions 2, where by a bolster 4 which is provided with rollers 5 is adapted in the turning of the vehicle to rise up the inclined portions 3 to elevate the vehicle body to clear the wheels 6 to enable the vehicle to make short and abrupt turns with perfect ease and safety. The fifth wheel is provided at its sides on its lower face with depending flanges 7, which are arranged on opposite sides of and partially embrace the sand board or bolster 8. The front and back portions 2 of the fifth wheel are sustained by supports 9, which extend upward from the front hounds and which may be posts of any suitable construction. The roller 5 of the bolster 4 is preferably solid and provided at its ends with journals, which are arranged in eyes of bolts 10, but rollers or wheels of other constructions may be employed if desired. The king or pivot bolt 11 extends through the bolster 4, and is arranged in a vertically disposed tubular bushing 12, which is mounted in the axle 13 and the sand board 8 to form a bearing for the bolt 11. The tubular bushing is provided at its upper end with a flange 14, which is set in an annular recess of a plate 15, secured to the upper face of the sand board. The bolster 4 is maintained in proper position and the king bolt is retained in the bearing by a stay chain 16 and a spring 17, extending from the bolster to the tongue.

It will be seen that the fifth wheel is simple and comparatively inexpensive in construction, and that it is capable of enabling a vehicle to turn short or abruptly without liability of the front wheels coming in contact with the vehicle body.

Changes in the form, proportion and the minor details of construction may be resorted to without departing from the principle or sacrificing any of the advantages of this invention.

What we claim is—

1. The combination with the front portion of a running gear, of a circular fifth wheel having raised front and rear portions and oppositely inclined side portions and secured to the sand board and provided with depending flanges arranged on opposite sides of the sand board, the vertical supporting posts mounted on the front hounds and arranged beneath the front and rear portion of the fifth wheel, and a bolster pivotally mounted on the axle and provided with rollers arranged on its lower face and bearing on the fifth wheel, substantially as described.

2. The combination with the front portion of a vehicle, of the circular fifth wheel having raised front and rear portions and oppositely inclined side portions, a bolster having a king bolt loosely pivoted to the front axle and provided with rollers arranged on the fifth wheel, and a yielding stay chain provided with a spiral spring and connected with the bolster, substantially as described.

In testimony that we claim the foregoing as our own we have hereto affixed our signatures in the presence of two witnesses.

EDWARD V. WAGNER.
SAMUEL H. PENQUITE.

Witnesses:
O. H. BARBER,
S. A. SANDY.